J. CLARRIDGE.
COTTON-SEED PLANTER.

No. 178,413.  Patented June 6, 1876.

Witnesses:
H. S. Kittredge
John Bandon

Inventor:
John Clarridge
by his Attys
Pecker & Co.

UNITED STATES PATENT OFFICE.

JOHN CLARRIDGE, OF MOUNT STERLING, OHIO.

IMPROVEMENT IN COTTON-SEED PLANTERS.

Specification forming part of Letters Patent No. 178,413, dated June 6, 1876; application filed September 2, 1875.

*To all whom it may concern:*

Be it known that I, JOHN CLARRIDGE, of Mount Sterling, in the county of Madison and State of Ohio, have invented certain new and useful Improvements in Cotton-Seed Planters; and I do hereby declare that the following is a full, clear, and exact description thereof, which will enable others skilled in the art to which it appertains to make and use the same, reference being had to the accompanying drawings, and to the letters of reference marked thereon, which form a part of this specification, in which—

Figure 1:
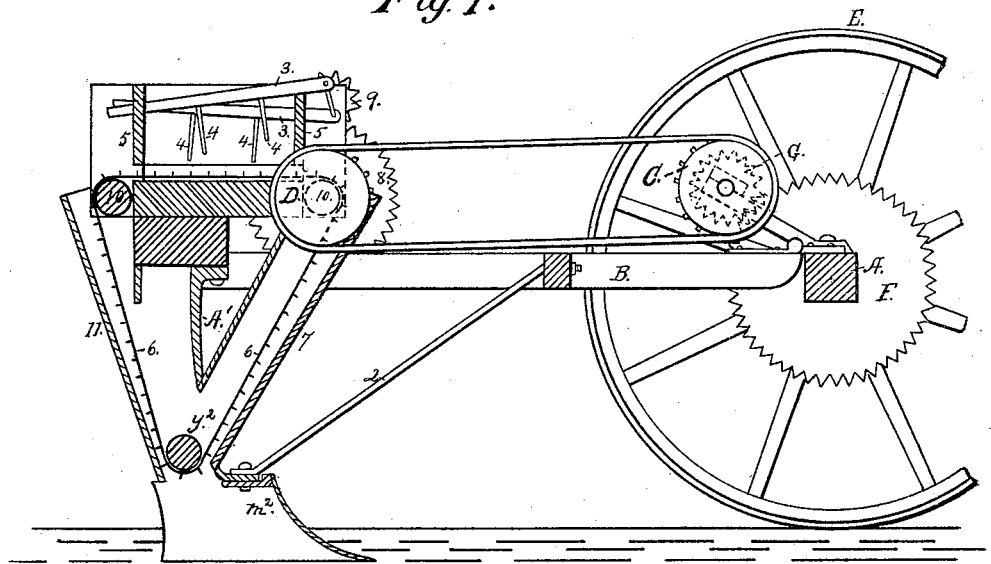
Figure 2:
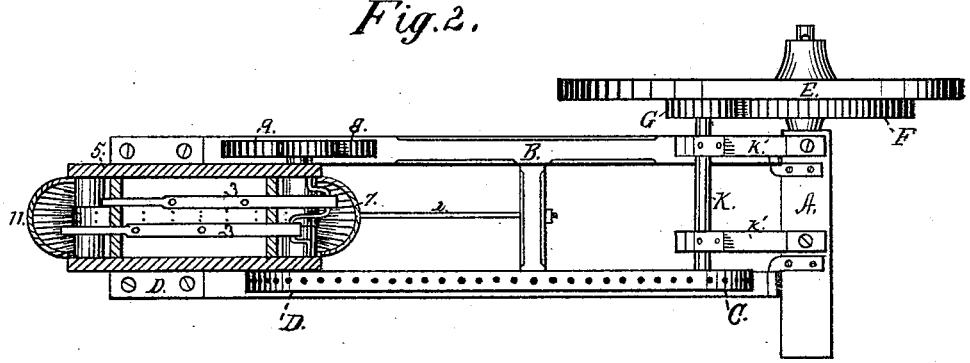

Figure 1 is a plan view of a portion of my improved cotton-seed planter. Fig. 2 is a side elevation of the same.

The object of my invention is to provide simple yet efficient devices for thoroughly separating the seed fibers, and delivering them to an endless toothed apron, which conveys them to the bottom of the standards, and deposits them in the furrows made by the plows.

My improvement consists in the combination, with reciprocating pickers having an oscillating motion, of an endless belt provided with short teeth, particularly arranged with reference to the hopper-chutes and standard, as will be herewith described.

Hinged to the axle A, supported in the usual manner upon wheels E, are a set of rearwardly-projecting plow-frames, B, Figs. 1 and 2. These frames support upon their rear ends the seed-boxes or hoppers 5. To the under side of the frames, just beneath the hoppers, are bolted the standards or shanks A', to which the plows are attached. The bottom of the seed-box has a groove or mortise, in which is an endless apron or belt, 6, passing through openings in each end of the box, over pulleys 10, and down through chutes 11 and 7, over a third pulley, $y^2$, pivoted in the bottom of the standard. Upon this belt are rows of short teeth at equal distances apart. In the seed-box are two reciprocating pickers, 3, provided with pendent teeth 4, which extend nearly to the bottom of the box. These pickers are attached at their forward ends to a double zigzag crank, and their rear ends work in guides in the end of the box. Motion is imparted to this mechanism from the supporting-wheel E, which has revolving with it a gear-wheel, F, ending with a small gear-wheel, G, keyed upon a shaft, K, supported in bearings K', just in the rear of, and parallel to, the axle. Upon this shaft are small pulleys C, one for each plow-frame, (of which there may be several,) from which belts pass to the pulleys D, that drive the rollers 10, carrying the endless apron. Upon the roller 10 is also a spur-wheel, 8, which engages with the pinion 9, and imparts motion to the crank and pickers.

The cotton-seed is placed in the box, and its fibers are separated by the action of the pickers. The teeth upon the traveling apron take hold of and convey the seed in nearly a uniform quantity through the chute and standard, depositing it in the furrow made by the plow.

Having thus fully described my invention, I claim as new and desire to secure by Letters Patent—

The toothed apron 6, arranged as described, in combination with the pickers 3, hoppers 5, chutes 7 and 11, and standard A', substantially as and for the purpose specified.

In testimony that I claim the foregoing as my own I affix my signature in presence of two witnesses.

JOHN CLARRIDGE.

Witnesses:
 CHAS. M. PECK,
 WM. RITCHIE.